(12) United States Patent
Lee

(10) Patent No.: US 9,017,548 B2
(45) Date of Patent: Apr. 28, 2015

(54) OIL COLLECTING APPARATUS

(71) Applicant: Jung Ho Lee, Jeju-si (KR)

(72) Inventor: Jung Ho Lee, Jeju-si (KR)

( * ) Notice: Subject to any disclaimer, the term of this patent is extended or adjusted under 35 U.S.C. 154(b) by 0 days.

(21) Appl. No.: 14/305,151

(22) Filed: Jun. 16, 2014

(65) Prior Publication Data

US 2015/0034540 A1 Feb. 5, 2015

(30) Foreign Application Priority Data

Aug. 5, 2013 (KR) .................. 10-2013-0092326

(51) Int. Cl.
| | |
|---|---|
| *E02B 15/10* | (2006.01) |
| *E02B 15/04* | (2006.01) |
| *B01D 17/02* | (2006.01) |
| *C02F 103/00* | (2006.01) |

(52) U.S. Cl.
CPC ............ *E02B 15/045* (2013.01); *E02B 15/106* (2013.01); *B01D 17/0214* (2013.01); *C02F 2103/007* (2013.01); *Y10S 210/923* (2013.01)

(58) Field of Classification Search
CPC ..... E02B 15/045; E02B 15/10; E02B 15/106; B01D 17/0208; B01D 17/0214; C02F 1/40; C02F 2103/007
USPC .................. 210/122, 170.05, 170.09, 170.11, 210/242.3, 255, 521, 522, 540, 923
See application file for complete search history.

(56) References Cited

U.S. PATENT DOCUMENTS

| | | | | | |
|---|---|---|---|---|---|
| 1,457,637 | A | * | 6/1923 | Sievers .......................... | 210/122 |
| 3,844,944 | A | * | 10/1974 | Mercuri ..................... | 210/242.3 |
| 3,847,816 | A | * | 11/1974 | DiPerna ..................... | 210/242.3 |
| 4,695,376 | A | * | 9/1987 | Astrom et al. ................ | 210/122 |
| 4,892,666 | A | * | 1/1990 | Paulson ..................... | 210/242.3 |
| 5,030,342 | A | * | 7/1991 | Ortega ........................ | 210/242.3 |
| 5,108,591 | A | * | 4/1992 | Hagan ........................ | 210/242.3 |
| 5,118,412 | A | * | 6/1992 | Schmidt ...................... | 210/122 |
| 5,693,218 | A | * | 12/1997 | Yamamoto et al. ......... | 210/242.3 |
| 6,743,358 | B1 | * | 6/2004 | Lundback ................. | 210/242.3 |
| 7,927,490 | B2 | * | 4/2011 | Teichroeb et al. ............ | 210/521 |

FOREIGN PATENT DOCUMENTS

KR     1019990031453     5/1999

* cited by examiner

*Primary Examiner* — Christopher Upton

(57) ABSTRACT

An oil collecting apparatus is provided to recover polluted nature environment and to keep nature environment clean in such a way that oil leaked over river or ocean is effectively collected on the spot, and only the oil is removed by separating water and oil, wherein the volume of the water tank configured to separate water and oil can be reduced in half, so the present invention may be applied to a small size ship, and only the oil leaked over river and ocean may be separated and collected on the spot. A water surface cleaner with an excellent oil connecting capacity may be built using the present invention.

1 Claim, 7 Drawing Sheets

US 9,017,548 B2

OIL COLLECTING APPARATUS

CROSS REFERENCE

This application claims foreign priority under Paris Convention to Korean Patent Application No. 10-2013-0092326, filed 5 Aug. 2013, with the Korean Intellectual Property Office.

BACKGROUND

The present invention relates to an oil collecting apparatus, and in particular to an oil collecting apparatus which makes it possible to recover polluted nature environment and to keep nature environment clean in such a way that oil leaked over river or ocean is effectively collected on the spot, and only the oil is removed by separating water and oil.

Generally speaking, when a ship (more specifically, an oil tanker which carries crude oil) strands on river or ocean while it sails, the oil held in the ship leaks for thereby polluting river or ocean, which results in severe environment problems.

It is hard to effectively collect the leaned oil, so the leaked oil spreads more and more with the aid of tides, thus killing fishes and shells in the farms, so large accidents may occur, causing economical damages.

According to a related prior art, adsorption cloths are covered on the leaked oil which is locked up by an oil fence, thus collecting the oil-sucked adsorption cloths. This method seems to be a primitive way, so many workers are necessary during the collecting work, and it is almost impossible to collect the leaked oil within a short time period. Lots of leaked oil may spread faster, so such pollutions may threaten the whole biological system of the ocean.

In the above mentioned occasion, the best way is to previously prevent such accidents; however once the marine pollution accident occurs, the marine pollution area fast increases due to tide and wave and sea water circulation. So, it is very important to minimize the marine pollution area by quickly managing the pollution accident in a proper way. In case of such a marine accident, quicker and more efficient oil collection are the best way.

According to Korean Patent Registration No. 10-0239829, as illustrated in FIG. 1, there is provided a marine leaked-oil collecting and treatment apparatus which is configured to quickly collect oil when a marine pollution accident occurs for thereby reducing the required number of workers who set up an effective marine pollution plan and a pollution accident management while saving related costs.

FIG. 1 is a schematic view illustrating a construction of an oil collecting apparatus of the related prior art. The oil collecting apparatus of the related prior art comprises a suction unit which includes a floating suction member which floats on a sea water so as to quickly suck floating oil spread over a wide area of the sea water and sucks the oil from the surfaces of the sea water, and an ejector 2 configured to generate sucking force with the aid of a pressure drop occurring when fluid passes at a high speed by means of a main pump 1 in order for suction force to generate in the floating suction member; a separation unit configured to separate based on a viscosity difference the mixed fluid sucked by means of the suction unit and separated by a multi-stage tank including an open separation tank 7 wherein part of a ship bottom is open for the water separated from the oil to be automatically discharged and the separation unit is installed in the ship; and a transfer control unit which includes a multi-stage tank configured to transfer the fluid of the separation unit, water-oil sensors 5, 5a and 5b installed in each separation unit for adjusting and controlling the operations of the pump, and control panel and controllers 8a, 8b and 8c configured to receive signals from the water-oil sensors and to perform control operations.

The separation unit comprises a stabilization tank 4 configured to stabilize the mixed fluid inputted at a high speed from the suction unit and separated by a multi-stage partition 4a for the sake of separations based on a viscosity difference; an open separation tank 6 configured to separate the mixed fluid inputted from the stabilization tank 4 based on a viscosity difference wherein the bottom of the open separation tank 6 is open in order for the water of the separated lower side to be naturally discharged; and a separation tank 7 configured to finally separate the water and oil in such a way to spray the floating oil onto tops of the stabilization tank 4 and the open separation tank 6 with the aid of the transfer control unit.

The oil collecting apparatus of the related art has problems in that parts are expensive, and a plurality of devices are linked in a complicated form, so the manufacture costs a lot, and a well-trained worker should handle the apparatus, so the related art is not economical, and it takes a lot of time to operate the apparatus.

SUMMARY OF THE INVENTION

Accordingly, it is an object of the present invention to provide an oil collecting apparatus which makes it possible to prevent environment pollution in such a way to collect the leaked oil for a short time period using a small number of workers when oil leaks over river or ocean.

It is another object of the present invention to provide an oil collecting apparatus which is configured to effectively collect the oil leaked over river or ocean by separating water and oil in a water tank after sucking water and oil with the aid of the suction force of a pump and to minimize any damage to fishermen for thereby preventing environmental pollutions, which results in clean nature environment.

It is further another object of the present invention to provide an oil collecting apparatus which is characterized in that an inner water tank is installed in an outer water tank, and oil and water floating on ocean or river is sucked into the inner water tank, so the outer water tank overflows with the oil floating on the water, and only the oil is separated from the outer water tank, thus minimizing the volume of the water tank and collecting the oil at lower cost.

To achieve the above objects, there is provided an oil collecting apparatus, comprising a suction unit which is configured to suck oil floating in ocean or river and is connected through a suction hose to a suction pump; a suction pump which provides a suction force to the suction unit; a first water tank which is configured to store a mixture of water and oil sucked by the suction unit and includes an oil discharge port on top so as to discharge oil floating on water and a water discharge valve installed in a lower side closer to the bottom and configured to discharge water; and a second water tank which is connected to the oil discharge port of the first water tank and to store the oil stored and floating in the first water tank and includes an oil discharge valve installed on top and is installed lower than the height of the oil discharge port of the first water tank for thereby discharging oil to the oil storing tank, and a water discharge valve installed in bottom for discharging water.

According to an exemplary embodiment of the present invention, the suction unit comprises a suction hose connected to a suction pump so as to receive suction force; a buoy configured to provide buoyancy in order for a suction port of the suction hose to float on the same water level as the water surface so as to suck oil on ocean or river; and a shutoff plate installed at a predetermined distance on a front side of the suction port which faces downward when sucking through the suction port of the suction hose for thereby shutting off the direct suction of water.

According to another exemplary embodiment of the present invention, there is provided an oil collecting apparatus, comprising a suction unit which is configured to suck oil floating in ocean or river and is connected through a suction hose to a suction pump; a suction pump which provides a suction force to the suction unit; a first water tank which is installed in a second water tank and is connected to the suction unit for thereby storing a mixture of water and oil and includes a water discharge valve in a lower side closer to the bottom so as to discharge water; and a second water tank which includes the first water tank and discharges the oil overflowing from the first water tank into an oil discharge port installed in the bottom surface and stores in the oil storing tank.

The suction unit comprises a suction hose connected to the suction pump and configured to receive suction force; a length adjusting tube in the interior of which the suction hose is inserted; a shutoff support tube into which the length adjusting tube is inserted from above; a buoy which provides a buoyancy so that the suction port of the suction hose may float on the same level as the water surface so as to suck the oil floating in ocean or river; a shutoff plate which is installed in a lower side of the shutoff plate support tube with a predetermined interval from a front side of the suction port facing downward when the suction port of the suction hose sucks for thereby shutting off a direct suction of water; and a fixing unit which is configured to fix the length adjusting tube inserted in the shutoff plate support tube.

According to an exemplary embodiment of the present invention, a winch is installed on a deck of the moving means which carries the oil collecting apparatus, and a rope roller is installed on top of a side surface of the moving means, and an ascending and descending rope wound on a rotary reel of the winch is connected to the shutoff plate of the suction unit for thereby driving the winch, and the suction unit keeps a predetermined interval from the water surface where oil floats by winding or unwinding the ascending and descending rope.

According to an exemplary embodiment of the present invention, the first water tank and the second water tank are installed in the third water tank, and the top of the first water tank is higher by "h1" than the top of the second water tank, so the oil filed in the second water tank overflows and does not reversely flow into the first water tank, and an oil discharge port is installed in the bottom surface of the third water tank, so the oil filled in the third water tank flows through the oil discharge port and is stored in the oil storing tank.

According to an exemplary embodiment of the present invention, the water tank is installed by at least four in number, and the remaining water tanks are installed in the outer most water tank, and the height of the first water tank and the top of the outer most water tank are higher than the other water tanks, so the oil overflowing from the first water tank is continuously filled in the remaining water tanks and overflows and is discharged through the oil discharge port formed in the bottom surface of the outer most water tank, so pure oil is separated in proportion to the number of the water tanks and is stored in an oil storing container.

According to an exemplary embodiment of the present invention, a water discharge valve is installed in a lower side closer to the bottom of the first water tank in order for the water supplied from the suction hose not to overflow for thereby adjusting the water level by discharging outside the water.

According to an exemplary embodiment of the present invention, a piston is installed in a bottom surface of the water tank except for the outer most water tank, and a piston rod configured to ascend or descend the piston is configured to ascend or descend by means of each hydraulic cylinder.

According to an exemplary embodiment of the present invention, a drain hose configured to drain outside the water in the bottom of the first water tank is prolonged to the bottom of the first water tank for thereby discharging the water with the aid of a drain pump.

The present invention is characterized in that the volume of the water tank configured to separate water and oil can be reduced in half, so the present invention may be applied to a small size ship, and only the oil leaked over river and ocean may be separated and collected on the spot. A water surface cleaner with an excellent oil connecting capacity may be built using the present invention. If a marine pollution accident occurs, it is possible to quickly dispatch a water surface cleaner to the spot, thus collecting leaked oil, which results in effective marine pollution prevention while saving workers and costs for pollution accident managements.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

The exemplary embodiments of the present invention will be described with reference to the accompanying drawings.

Figure 1:
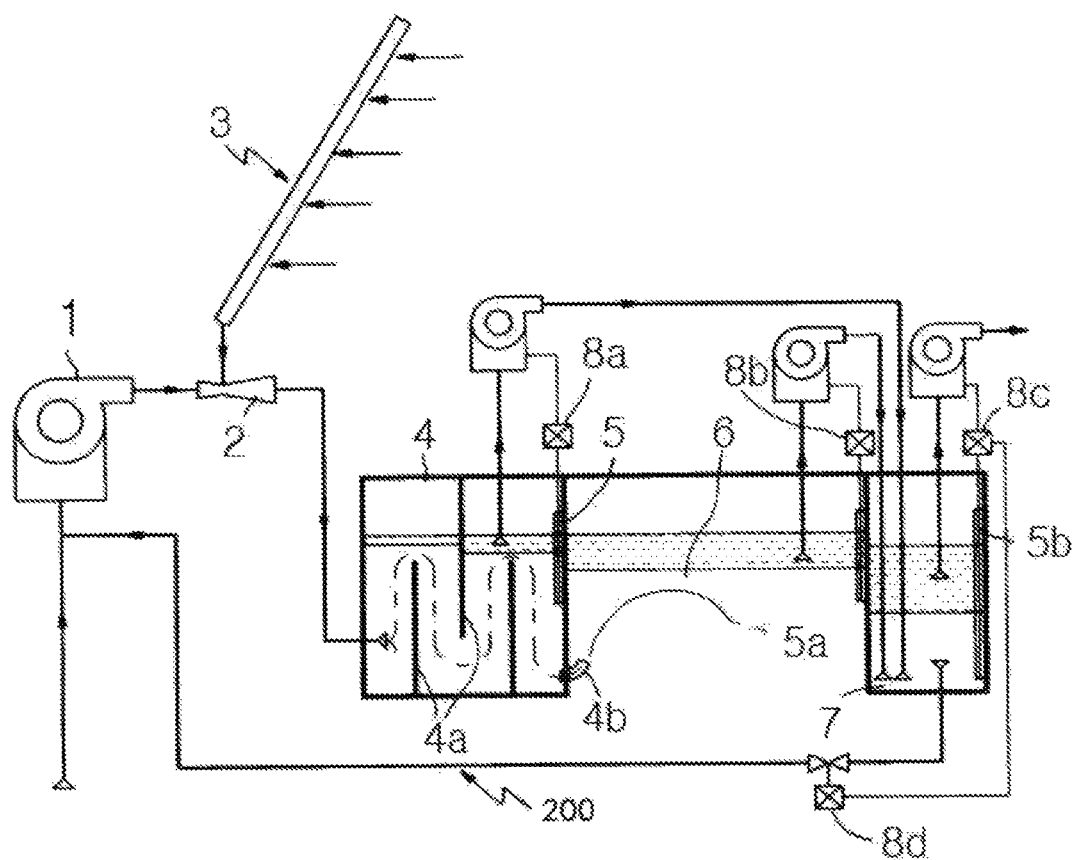
FIG. 1 is a schematic view illustrating an oil collecting apparatus of a related art.
Figure 2:
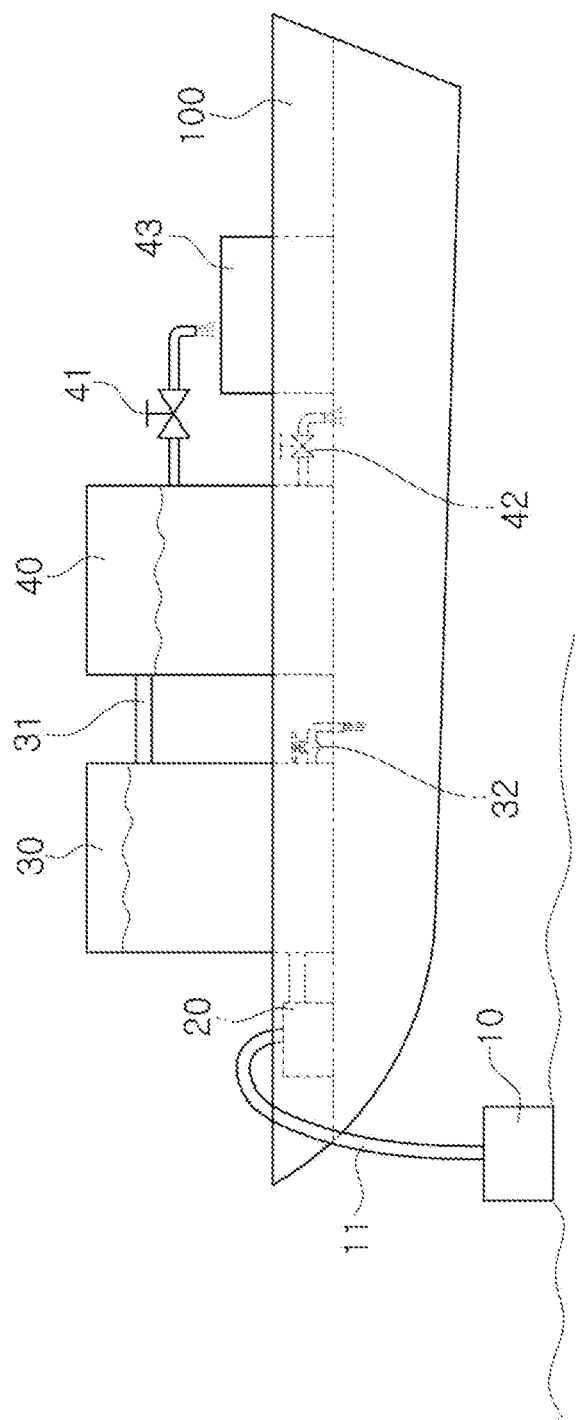
FIG. 2 is a block diagram illustrating a construction of an oil collecting apparatus according to the present invention.

FIG. 2 is a block diagram illustrating a construction of an oil collecting apparatus according to the present invention.

The oil collecting apparatus according to the present invention comprises a suction unit 10 which is configured to suck oil floating in ocean or river and is connected through a suction hose 11 to a suction pump 20; a suction pump 20 which provides a suction force to the suction unit 10; a first water tank 30 which is configured to store a mixture of water and oil sucked by the suction unit 10 and includes an oil discharge port 31 on top so as to discharge oil floating on water and a water discharge valve 32 installed in a lower side closer to the bottom and configured to discharge water; and a second water tank 40 which is connected to the oil discharge port 31 of the first water tank 30 and to store the oil stored and floating in the first water tank 30 and includes an oil discharge valve 41 installed on top and is installed lower than the height of the oil discharge port 31 of the first water tank 30 for thereby discharging oil to the oil storing tank 43, and a water discharge valve 42 installed in bottom for discharging water.

Reference number 100 represents a ship, more specifically, it represents a moving unit which is configured to move from a land to ocean or river where oil floats.

At this time, at least one of the water tank walls forming the front side, rear side, left side and right side of the first water tank 30 and the second water tank 40 are made from a transparent glass or a synthetic resin material, so the water levels of the first and second water tanks 30 and 40 can be visually checked from the outside for thereby previously managing any accident.

Figure 3A:
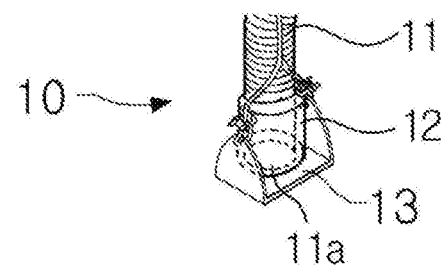
FIG. 3A is a perspective view illustrating a construction of a suction unit according to an exemplary embodiment of the present invention.
Figure 3B:
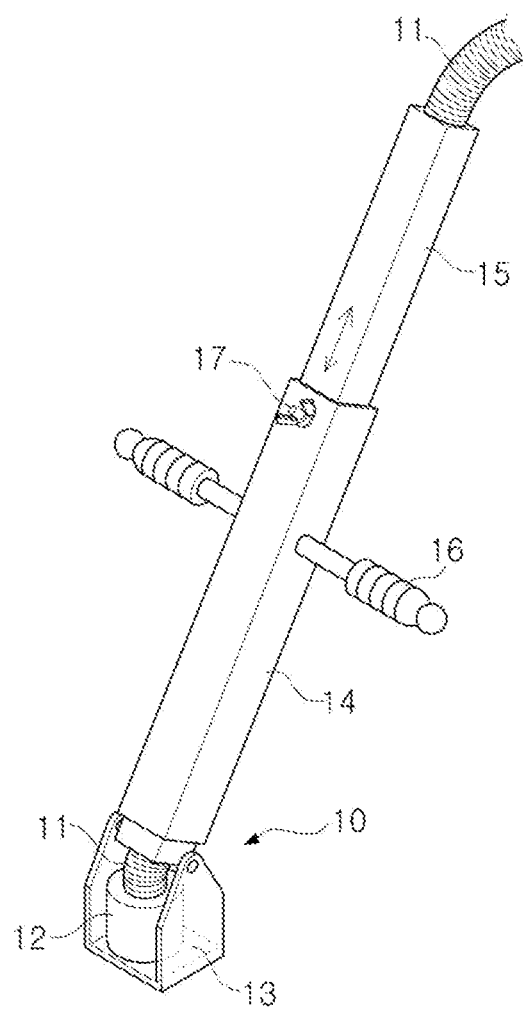
FIG. 3B is a perspective view illustrating a suction unit according to another exemplary embodiment of the present invention.

FIG. 3A is a perspective view illustrating a construction of a suction unit according to an exemplary embodiment of the present invention, and FIG. 3B is a perspective view illustrating a suction unit according to another exemplary embodiment of the present invention.

The suction unit 10 according to the present invention comprises a suction hose 11 connected to a suction pump 20 so as to receive suction force; a buoy 12 configured to provide buoyancy in order for a suction port 11a of the suction hose 11 to float on the same water level as the water surface so as to suck oil on ocean or river; and a shutoff plate 13 installed at a predetermined distance on a front side of the suction port 11a which faces downward when sucking through the suction port 11a of the suction hose 11 for thereby shutting off the direct suction of water.

Here, the suction hose 11 is a tube with a predetermined diameter large enough to suck lots of water or oil and may be made from a synthetic resin material or a metallic material. The buoys 12 are attached around the suction port 11a of the suction hose 11. The buoys 12 are filled with air, thus providing a predetermined buoyancy so as to withstand the weight of the suction unit 10.

In the opposite side of the suction port 11a of the suction hose, the shutoff plate 13 is attached to the buoy 12, for thereby preventing the phenomenon that the oil is not sucked due to the water which is sucked through the suction port 11a.

The water may not be sucked from the front side by means of the shutoff plate 13 installed on the front side of the suction port 11a but sucked from the lateral side, so when the suction port 11a floats on the water surface, it works like the suction port with holes on its side surface.

FIG. 3B is a view illustrating the suction unit 10 according to another exemplary embodiment. When in operation after the oil collecting apparatus is installed in a small size ship, not a big size ship, a worker can suck the floating oil with the suction unit 10 held in the hands.

The suction unit 10 according to the present exemplary embodiment of the present invention comprises a suction hose 11 connected to the suction pump 20 and configured to receive suction force; a length adjusting tube 15 in the interior of which the suction hose 11 is inserted; a shutoff support tube 14 into which the length adjusting tube is inserted from above; a buoy 12 which provides a buoyancy so that the suction port 11a of the suction hose 11 may float on the same level as the water surface so as to suck the oil floating in ocean or river; a shutoff plate 13 which is installed in a lower side of the shutoff plate support tube 14 with a predetermined interval from a front side of the suction port 11a facing downward when the suction port 11a of the suction hose 11 sucks for thereby shutting off a direct suction of water; and a fixing unit which is configured to fix the length adjusting tube inserted in the shutoff plate support tube 14.

Reference number 16 represents a handle that a worker holds when it needs to adjust the length of a length adjusting tube 15 which is inserted in a shutoff plate support tube 14. During the collection of oil, the worker may collect oil floating on the water surface with the handle held in the hands.

The suction unit 10 of the exemplary embodiment of the present invention is characterized in that the length adjusting tube 15 and a shutoff plate support tube 14 are hollow tubes for receiving the suction hose 11. In the drawings, the length adjusting tube 15 and a shutoff plate support tube 14 are rectangular tube, but they may be cylindrical tubes or other polygonal tubes.

The suction unit 10 is made in a compact size so that the oil collecting apparatus of the present invention may be installed in a small size ship, and the worker may collect floating oil with the length adjusting tube 15 or the handle 16 of the suction unit 10 held in the hands.

Therefore, the suction hose 11 has a predetermined length long enough to be inserted into the length adjusting tube 15 and the shutoff plate support tube 14 for the worker to hold the suction hose 11, and the shutoff plate 13 and the buoy 12 are made in predetermined sizes for the worker to handle easily.

The suction pump 20 according to the present invention is connected to the suction hose 11 of the suction nit 10 and is configured to generate negative suction pressure for thereby making the interior of the suction hose 11a vacuum state, so suction force may be generated due to the pressure difference between the atmosphere and the interior of the suction hose 11 for thereby sucking the oil floating on ocean or river and supplying into the first water tank 30.

The first water tank 30 is configured to store oil and water, and the oil with low viscosity floats on the water with high viscosity, so the oil and water are supplied from the suction unit 10 through the suction hose 11. As the amount of water and oil increases, the water level also increases, and at the same time, the water level of the oil increases, so the oil floating on the water flows through an oil discharge port 31 installed on top of the first water tank 30 into a second water tank 40.

If the increasing water is left unmanaged, the water may flow into the oil discharge port 31 of the first water tank 30, so the first water tank 30 may overflow with the water. For this, a water discharge valve 32 configured to discharge water is installed at a lower side close to the bottom of the first water tank 30, so it is possible to adjust the water level by opening or closing the water discharge valve 32 depending on the amount of water.

The second water tank 40 is configured to receive the oil from the first water tank 3 and to store the oil. In this case, only the oil is not inputted from the first water tank 30. More specifically, a small amount of the water may be inputted along with the oil, so the oil discharge valve 41 is installed on the top like in the first water tank 30, thus storing in an oil storing tank 43.

The installation height of the oil discharge valve 41 is lower than the height of the oil discharge port 31 of the first water thank 30, so the oil does not reversely flow from the second water tank 40 into the first water tank 30.

A water discharge valve 42 is installed at the bottom of the second water tank 40 so as to discharge the water which is stored in the bottom of the second water tank 40, thus adjusting the water level.

Figure 4A:
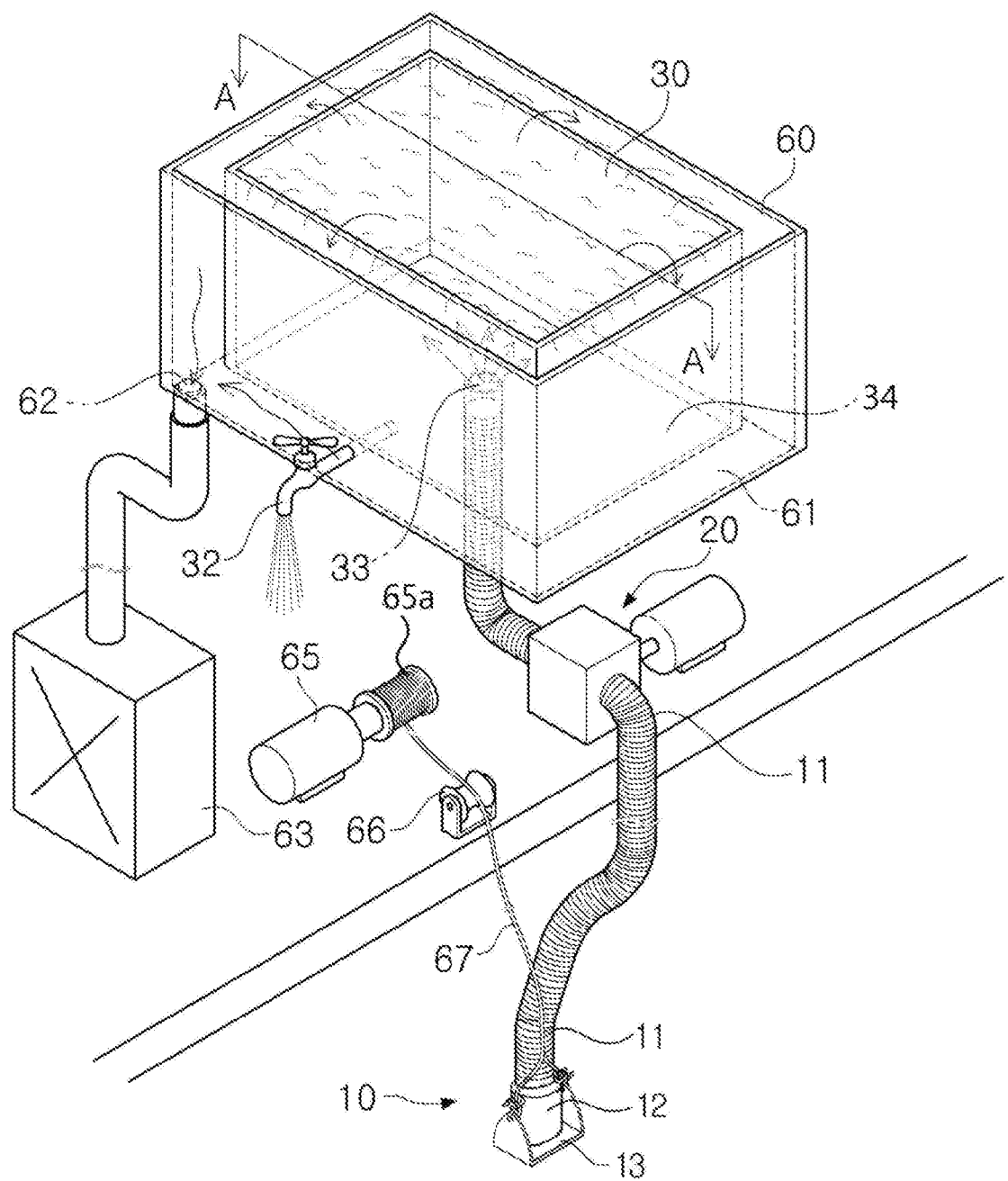
FIG. 4A is a view illustrating an oil collecting apparatus according to another exemplary embodiment of the present invention.
Figure 4B:
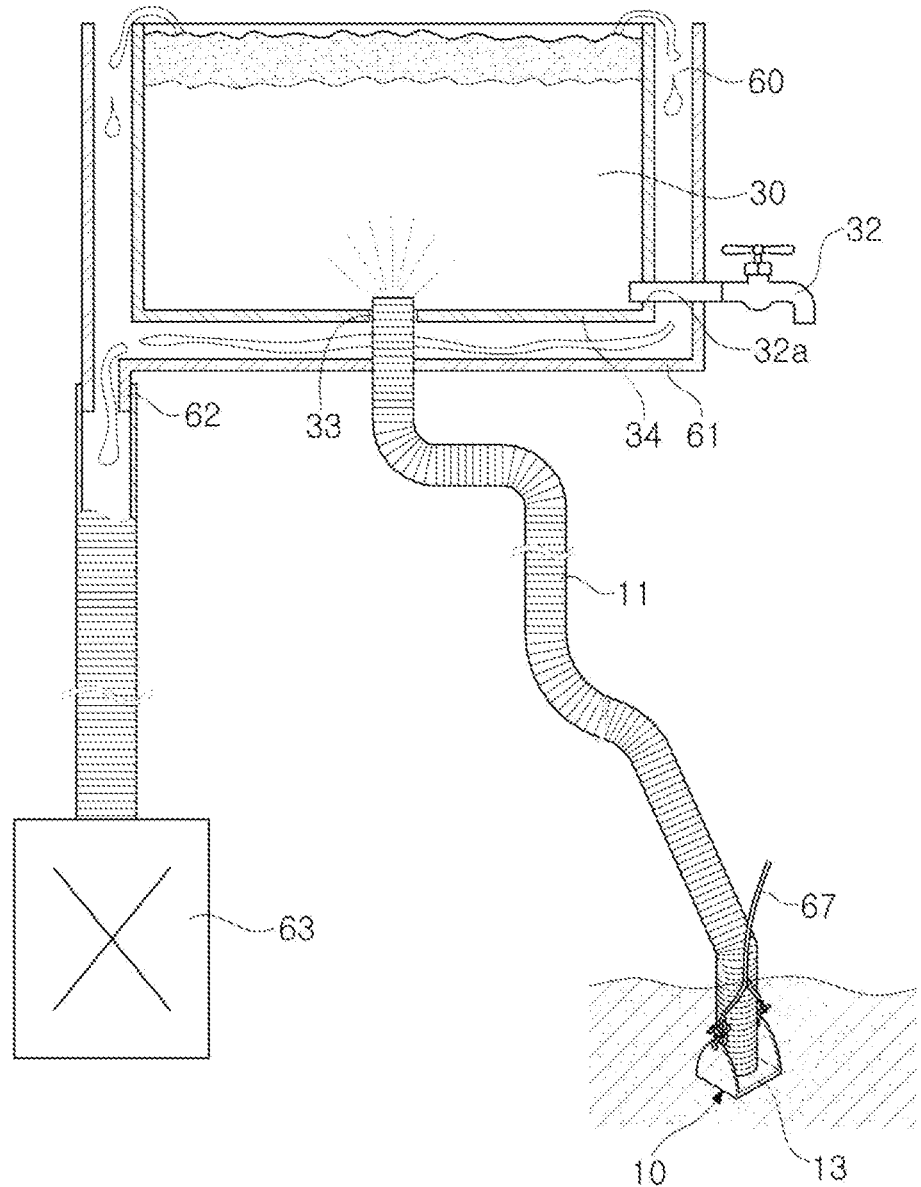
FIG. 4B is a cross sectional view taken along line A-A of FIG. 4A of the oil collecting apparatus according to the present invention.

FIG. 4A is a view illustrating an oil collecting apparatus according to another exemplary embodiment of the present invention, and FIG. 4B is a cross sectional view taken along line A-A of FIG. 4A of the oil collecting apparatus according to the present invention.

The oil collecting apparatus according to the present exemplary embodiment of the present invention is characterized in that the first water tank 30 is installed in the second water tank 60, and the oil overflowing from the first water tank 30 is discharged through the bottom surface 61 of the second water tank into the oil discharge port 62 and is stored in the oil storing tank 63.

The first water tank 30 and the second water tank 60 both are formed in rectangular parallelepiped shapes, but they may be formed in cylindrical shapes or spherical shapes. In the first water tank 30, there is provided a hose connection port 33 wherein the suction hose 11 is connected to the bottom surface 34.

The suction hose 11 passes through the bottom surface 61 of the second water tank 60 and is connected to the hose connection port 33 installed on the bottom surface 34 of the first water tank 30.

A water discharge port 32a is provided at a lower side close to the bottom of the first water tank 30 so as to prevent the overflow of the water which is supplied from the suction hose 11, and a water discharge valve 32 is installed. The water discharge vale 32 is opened or closed depending on the amount of water.

On a deck of a moving unit such as a ship, a barge, etc. wherein the oil collecting apparatus of the present invention is installed, as illustrated in FIG. 4A, a winch 65 is installed, and a rope roller 66 is installed on top of a lateral side of the ship. An ascending and descending rope 67 wound on a rotary reel 65a of the winch 65 is connected to the shutoff plate 13 of the suction unit 10. As the winch 65 operates, the ascending and descending rope 67 is wound or unwound so that the suction unit 10 may keep a proper distance from the water surface of ocean or river where oil floats.

The oil collecting apparatus of the present exemplary embodiment of the present invention is characterized in that as compared with the first exemplary embodiment, the first water tank 30 is installed in the second water tank 60, so the volume of the water tank can be reduced almost in half, so the oil collecting apparatus of the present invention may be installed in a small size ship, thus obtaining an easier oil collecting work.

Figure 5A:
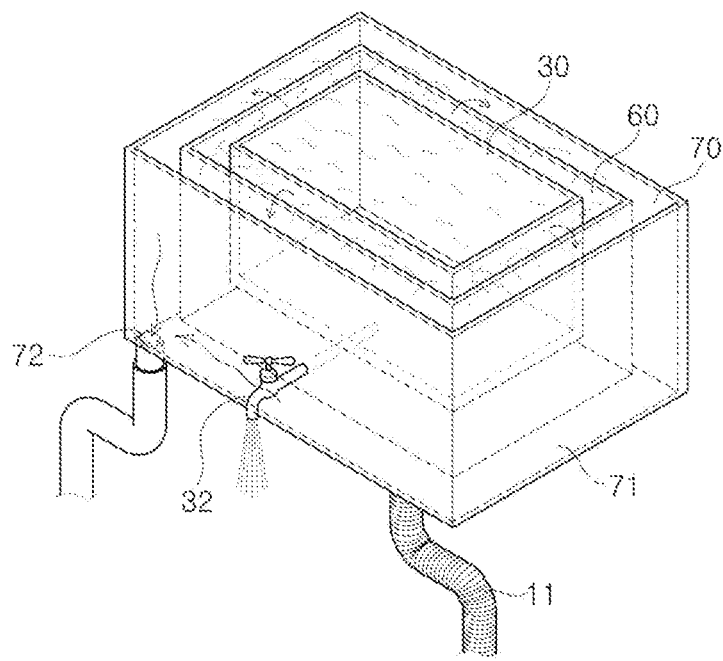
FIG. 5A is a view illustrating an oil collecting apparatus according to a third exemplary embodiment of the present invention.
Figure 5B:
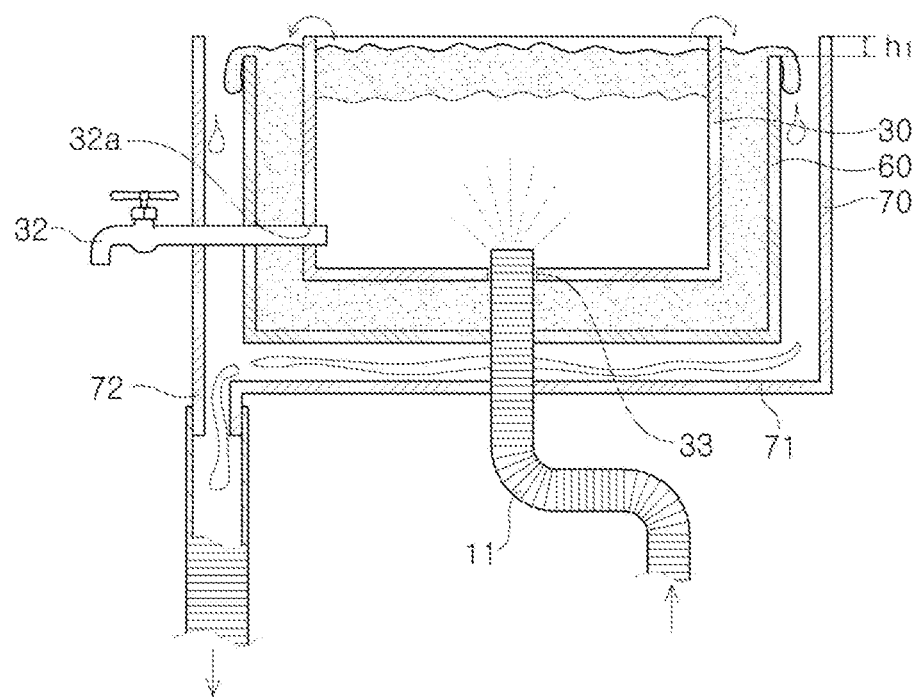
FIG. 5B is a cross sectional view taken along the center line of an oil collecting apparatus according to a third exemplary embodiment of the present invention.

FIG. 5A is a view illustrating an oil collecting apparatus according to a third exemplary embodiment of the present invention, and FIG. 5B is a cross sectional view taken along the center line of an oil collecting apparatus according to a third exemplary embodiment of the present invention.

The oil collecting apparatus according to the present exemplary embodiment of the present invention is characterized in that the first water tank 30 and the second water tank 60 are installed in a third water tank 70. As illustrated in FIG. 4B, in the bottom surface 34 of the first water tank 30, the suction hose 11 which passes through the bottom surfaces of the second water tank 60 and the third water tank 70 is connected to the hose connection port 33 for thereby supplying water and oil into the first water tank 30.

The oil overflowing from the first water tank 30 which receives water and oil from the suction hose 11 is stored in the second water tank 60, and due to the oil which overflows from the first water tank 30, the oil overflows from top of the second water tank 60.

At this time, as illustrated in FIG. 5B, the top of the first water tank 30 is higher by "h1" than the top of the second water tank 60, so the oil filled in the second water tank 60 overflows, but does not reversely flow into the first water tank 30. The top of the third water tank 70 is higher than or equal to the top of the first water tank 30, so the oil overflowing from the first water tank 30 does not overflow from the third water tank 70.

The oil filled in the second water tank 60 overflows and is filled in the third water tank 70. In this case, an oil discharge port 72 is installed in the bottom surface 71 of the third water tank 70, so the oil filled in the third water tank 70 flows through the oil discharge port 72 and is stored in the oil storing tank 63 as illustrated in FIG. 4A.

The oil collecting apparatus according to the third exemplary embodiment of the present invention is configured to separate twice oil and water, so more pure oil can be collected. As the number of the processes of separating water and oil increases, the purity of oil may be increased, so more than four water tanks are installed while minimizing the volumes that the apparatus occupies, whereby it is possible to collect more and more pure oil.

In the above, the exemplary embodiment of the oil collecting apparatus comprising the first water tank 30, the second water tank 60 and the third water tank 70 has been described; however the remaining water tanks are installed in the outer most water tanks in the same way with respect to more than four water tanks so as to more enhance the purity of collected oil, and the height of the first water tank 30 and the top of the outer most water tanks are higher than the other water tanks, so the oil overflowing from the first water tank 30 is filled in order in the second water tank 60, the third water tank 70, the fourth water tank, . . . , and overflows and moves through the oil discharge port formed in the bottom surface of the outer most water tank and is stored in the oil storing tank 63.

Here, in the lower side close to the bottom of the first water tank 30, a water discharge valve 32 is installed in the water discharge port 32a so as to prevent the overflow of the water which is supplied from the suction hose 11, thus adjusting the water level by discharging the water outside.

Figure 6A:
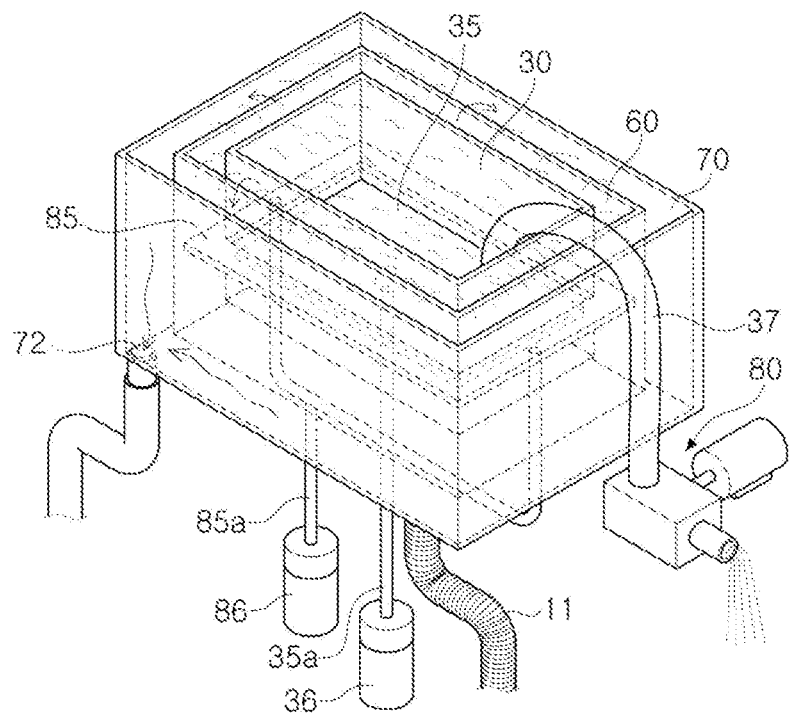
FIG. 6A is a view illustrating an oil collecting apparatus according to a fourth exemplary embodiment of the present invention.
Figure 6B:
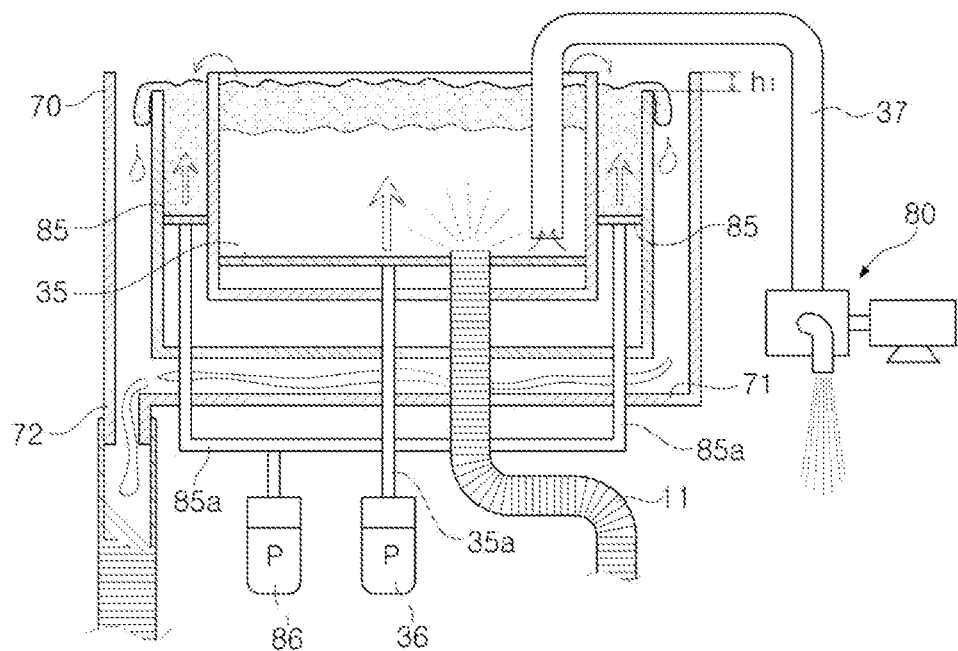
FIG. 6B is a cross sectional view taken along the center line of an oil collecting apparatus according to a fourth exemplary embodiment of the present invention.

FIG. 6A is a view illustrating an oil collecting apparatus according to a fourth exemplary embodiment of the present invention, and FIG. 6B is a cross sectional view taken along the center line of an oil collecting apparatus according to a fourth exemplary embodiment of the present invention.

The oil collecting apparatus according to the present exemplary embodiment of the present invention is characterized in that the first water tank 30 and the second water tank 60 are installed in the third water tank 70. As illustrated in FIG. 4B, in the bottom surface 34 of the first water tank 30, the suction hose 11 which passes through the bottom surfaces of the second water tank 60 and the third water tank 70 is connected to the hose connection port 33 for thereby supplying water and oil to the first water tank 30.

A first piston 35 is installed in the bottom surface of the first water tank 30, and a piston rod 35a configured to ascend and descend the first piston 35 ascends and descends by a hydraulic cylinder 36.

In the earlier exemplary embodiment of the present invention, it needs to wait until oil and water are filled in the water tank. However, in this exemplary embodiment of the present invention, it does not need to wait oil and water are filled in the water tank. More specifically, the first piston 35 is ascended when the worker wants, and the oil stored in the first water tank 30 is supplied to the second water tank 60 for thereby performing oil collecting work.

In order to discharge outside the water stored in the bottom, a drain hose 37 is prolonged from the above to the bottom of the first water tank 30 for thereby discharging water with the aid of a drain pump 80.

Here, the drain hose 37 may be installed in the bottom surface 34 of the first water tank 30 like the suction hose 11. At this time, the drain valve is installed instead of the drain pump 80. When a predetermined amount of water is filled in the first water tank 30, the drain valve is opened, and the water is discharged outside.

A second piston 85 surrounding the outer side of the first water tank 30 is installed in the bottom surface of the second water tank 60. A piston rod 85*a* configured to ascend and descend the second piston 85 is configured to ascend and descend by the hydraulic cylinder 86.

The oil stored in the second water tank 60 allows the second piston 85 to ascend, and the oil stored in the second water tank 60 is supplied to the third water tank 70. An oil discharge port 72 is installed in the bottom surface 71 of the third water tank 70, so the oil overflowing from the third water tank 70 is stored in the oil storing tank 63.

Here, the oil collecting apparatus comprising the first water tank 30, the second water tank 60 and the third water tank 70 according to an exemplary embodiment of the present invention has been described. However, the remaining water tanks are installed in the outer most tank in the same way with respect to more than four water tanks, and the height of the first water tank 30 and the top of the outer most water tank are higher than the other water tanks, so the oil overflowing from the first water tank 30 is filled in order into the second water tank 40, the third water tank 70, the fourth water tank, . . . , and overflows and moves through the oil discharge port formed in the bottom surface of the outer most water tank and is stored in the oil storing tank 63.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An oil collecting apparatus, comprising:
a suction unit which is configured to suck oil floating in ocean or river and is connected through a suction hose to a suction pump;
a suction pump which provides a suction force to the suction unit;
a first water tank which is configured to store and separate a mixture of water and oil sucked by the suction unit and includes an oil discharge port on top so as to discharge oil floating on water and a water discharge valve installed in a lower side closer to the bottom and configured to discharge water; and
a second water tank which is connected to the oil discharge port of the first water tank to store and further separate the oil stored and floating in the first water tank and includes an oil discharge valve installed on top which is installed lower than the height of the oil discharge port of the first water tank for thereby discharging oil to a third oil storing tank, and a water discharge valve installed in the bottom for discharging water, and
wherein the suction unit comprises:
a suction hose connected to the suction pump and configured to receive suction force;
a length adjusting tube into the interior of which the suction hose is inserted;
a shutoff plate support tube having a suction port into which the length adjusting tube is inserted from above;
a buoy which provides a buoyancy so that the suction port of the suction hose may float on the same level as the water surface so as to suck the oil floating in ocean or river;
a shutoff plate which is installed in a lower side of the shutoff plate support tube with a predetermined interval from a front side of the suction port facing downward when the suction port of the suction hose sucks for thereby permitting only a lateral suction of water; and
a fixing means which is configured to fix the length adjusting tube inserted in the shutoff plate support tube.

\* \* \* \* \*